United States Patent
Kim et al.

(10) Patent No.: US 10,540,572 B1
(45) Date of Patent: Jan. 21, 2020

(54) METHOD FOR AUTO-LABELING TRAINING IMAGES FOR USE IN DEEP LEARNING NETWORK TO ANALYZE IMAGES WITH HIGH PRECISION, AND AUTO-LABELING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/263,393

(22) Filed: Jan. 31, 2019

(51) Int. Cl.
*G06K 9/62* (2006.01)
*G06N 3/08* (2006.01)
(Continued)

(52) U.S. Cl.
CPC ........... *G06K 9/6256* (2013.01); *G06N 3/084* (2013.01); *G06T 5/50* (2013.01); *G06T 7/11* (2017.01);
(Continued)

(58) Field of Classification Search
CPC ... G06T 5/50; G06T 7/11; G06T 2207/20084; G06T 2207/20132; G06T 2207/20221; G06K 9/6256; G06N 3/084
(Continued)

(56) References Cited

U.S. PATENT DOCUMENTS

2017/0236032 A1* 8/2017 Lin .................. G06K 9/623
382/159
2017/0330320 A1* 11/2017 Lynch ................. A61B 6/5217
(Continued)

OTHER PUBLICATIONS

Choi, et al. "Automatic Tagging Using Deep Convolutional Neural Networks", pp. 1-7, Queen Mary University of London. (Year: 2016).*

*Primary Examiner* — Daniel G Mariam
(74) *Attorney, Agent, or Firm* — Xsensus, LLP

(57) ABSTRACT

A method for auto-labeling a training image to be used for learning a neural network is provided for achieving high precision. The method includes steps of: an auto-labeling device (a) instructing a meta ROI detection network to generate a feature map and to acquire n current meta ROIs, on the specific training image, grouped according to each of locations of each of the objects; and (b) generating n manipulated images by cropping regions, corresponding to the n current meta ROIs, on the specific training image, instructing an object detection network to output each of n labeled manipulated images having each of bounding boxes for each of the n manipulated images, and generating a labeled specific training image by merging the n labeled manipulated images. The method can be performed by using an online learning, a continual learning, a hyperparameter learning, and a reinforcement learning with policy gradient algorithms.

30 Claims, 5 Drawing Sheets

(51) Int. Cl.
*G06T 7/11* (2017.01)
*G06T 5/50* (2006.01)

(52) U.S. Cl.
CPC ............... *G06T 2207/20081* (2013.01); *G06T 2207/20084* (2013.01); *G06T 2207/20132* (2013.01); *G06T 2207/20221* (2013.01)

(58) Field of Classification Search
USPC ......................................................... 382/159
See application file for complete search history.

(56) References Cited

U.S. PATENT DOCUMENTS

| | | | |
|---|---|---|---|
| 2018/0096232 A1* | 4/2018 | Danielsson | G06K 9/6202 |
| 2018/0136332 A1* | 5/2018 | Barfield, Jr. | G01S 17/42 |
| 2018/0283892 A1* | 10/2018 | Behrendt | G01C 21/3673 |
| 2019/0065901 A1* | 2/2019 | Amato | G06K 9/6218 |

* cited by examiner

METHOD FOR AUTO-LABELING TRAINING IMAGES FOR USE IN DEEP LEARNING NETWORK TO ANALYZE IMAGES WITH HIGH PRECISION, AND AUTO-LABELING DEVICE USING THE SAME

FIELD OF THE DISCLOSURE

The present disclosure relates to a method and a device for auto-labeling training images to be used for learning a neural network.

BACKGROUND OF THE DISCLOSURE

Recently, methods of performing object identification and the like using machine learning are being studied. As one of the machine learning, a deep learning, which uses a neural network with several hidden layers between an input layer and an output layer, shows high recognizing performance.

And, the neural network using the deep learning generally learns through backpropagation using losses.

In order to perform learning of such a deep learning network, training data in which tags are added to individual data points by labelers are needed. Preparing this training data (i.e. classifying the data correctly) can be very labour-intensive, expensive and inconvenient, especially if a large amount of training data is to be used and if the quality of the data pre-preparation is not consistently high. Conventional interactive labeling can be computationally expensive and fail to deliver good results.

Therefore, in recent years, auto-labeling which adds tags, i.e., labels, to a training image using a deep learning-based auto labeling device is performed, and inspectors examine auto-labeled training images to correct the tags or the labels.

In the conventional auto-labeling, images are enlarged for accurate detection of small-sized objects, but enlarging sizes of the images causes increase of computational load.

Conversely, if the images are used as is to reduce the computational load, the small-sized objects cannot be detected properly, and thus accuracy decreases.

Accordingly, the inventors of the present disclosure propose an auto-labeling method capable of maintaining the accuracy and reducing the computational load.

SUMMARY OF THE DISCLOSURE

It is an object of the present disclosure to solve all the aforementioned problems.

It is another object of the present disclosure to detect and label small-sized objects in an image to be auto-labeled.

It is still another object of the present disclosure to detect and label the small-sized objects in the image to be auto-labeled, without increase of computational load.

It is still yet another object of the present disclosure to increase accuracy of auto-labeling without the increase of the computational load.

In accordance with one aspect of the present disclosure, there is provided a method for auto-labeling one or more training images to be used for learning a neural network, including steps of: (a) an auto-labeling device, if a specific training image among the training images is acquired, instructing a meta ROI detection network to generate at least one feature map by applying one or more convolution operations to the specific training image and to acquire n current meta ROIs corresponding to regions of objects, on the specific training image, grouped according to each of locations of each of the objects by referring to the feature map; and (b) the auto-labeling device generating n manipulated images by cropping regions, corresponding to the n current meta ROIs, on the specific training image, instructing an object detection network to output each of n labeled manipulated images having each of bounding boxes for each of the n manipulated images, and generating a labeled specific training image by merging the n labeled manipulated images.

As one example, at the step of (a), the auto-labeling device instructs the meta ROI detection network to calculate each of locations, each of sizes, and each of current meta ROI scores of each of the current meta ROIs in each of grid cells on the feature map, and then instructs the meta ROI detection network to determine specific current meta ROIs as the n current meta ROIs wherein the specific current meta ROIs correspond to specific current meta ROI scores, among the current meta ROI scores, equal to or greater than a first predetermined threshold.

As one example, the training images include validation images for verification, and the first predetermined threshold is a specific validation meta ROI score of a specific validation meta ROI, among validation meta ROIs acquired corresponding to the validation images, which has a highest probability of being correct.

As one example, the feature map includes two or more first feature map channels for calculating the locations of the current meta ROIs, two or more second feature map channels for calculating the sizes of the current meta ROIs, and at least one third feature map channel for calculating the current meta ROI scores.

As one example, each of the current meta ROI scores is each result of applying each sigmoid operation to each of probabilities of each of the current meta ROIs being correct.

As one example, at the step of (a), the auto-labeling device performs one of (i) a process of generating at least one downsized image by downsizing the specific training image and a process of instructing the meta ROI detection network to generate the feature map by applying the convolution operations to the downsized image and (ii) a process of instructing the meta ROI detection network to generate the downsized image by downsizing the specific training image and a process of instructing the meta ROI detection network to generate the feature map by applying the convolution operations to the downsized image.

As one example, the meta ROI detection network includes one or more convolutional layers.

As one example, at the step of (b), the auto-labeling device, in merging the n labeled manipulated images, removes one or more specific bounding boxes, among the bounding boxes, which appear only partially within a certain distance inward from boundaries of an overlapping area of two or more of the labeled manipulated images.

As one example, at the step of (b), the auto-labeling device, in merging the n labeled manipulated images, acquires one or more specific bounding boxes corresponding to one or more specific objects within an overlapping area of two or more of the labeled manipulated images by applying a Non Maximum Suppression to the bounding boxes within the overlapping area.

As one example, at the step of (b), the auto-labeling device resizes the n manipulated images to have a same size and instructs the object detection network to generate the bounding boxes.

As one example, the auto-labeling device resizes the n manipulated images of the same size including the bounding boxes to have a size corresponding to the specific training image and then merges the n manipulated images.

As one example, a learning device has instructed the meta ROI detection network to complete processes of (i) if at least one specific pre-training image among pre-training images is acquired, generating at least one feature map for pre-training by applying the convolution operations to the specific pre-training image, (ii) calculating meta ROIs for pre-training in each grid cell of the feature map for pre-training, (iii) generating one or more sample meta ROI groups, adjusted by at least one certain rule, corresponding to a meta ROI group for pre-training including the meta ROIs for pre-training, (iv) calculating each of sample meta group scores of each of the sample meta ROI groups, calculating a current meta group score of the meta ROI group for pre-training, and calculating at least one gradient for pre-training to adjust the current meta group score of the meta ROI group for pre-training in a direction derived from specific sample meta ROI groups having the sample meta group scores becoming high, and (v) learning at least part of one or more parameters of the meta ROI detection network by a reinforcement learning using the gradient for pre-training.

As one example, the current meta group score is acquired by accuracy(R)+C×efficiency(R), wherein the accuracy(R) is a ratio of the number of objects detected in all of the meta ROIs for pre-training to a total number of objects on the specific pre-training image, wherein the efficiency(R) is a difference between 1 and a ratio of a sum of areas of the meta ROIs for pre-training to an area of the specific pre-training image, and wherein the C is a maximum among 1 and validation meta group scores acquired corresponding to validation images for pre-training to be used for verification of the pre-training images.

As one example, a sample meta group score of an arbitrary one of the sample meta ROI groups is acquired by accuracy(R')+C×efficiency(R'), wherein the accuracy(R') is a ratio of the number of objects detected in all of sample meta ROIs in said arbitrary one of the sample meta ROI groups to a total number of objects on the specific pre-training image, wherein the efficiency(R') is a difference between 1 and a ratio of a sum of areas of the sample meta ROIs to an area of the specific pre-training image, and wherein the C is a maximum among 1 and validation meta group scores acquired corresponding to validation images for pre-training to be used for verification of the pre-training images.

As one example, the accuracy(R') is a ratio of the number of objects detected in specific sample meta ROIs, among the sample meta ROIs in said arbitrary one of the sample meta ROI groups, having sample meta ROI scores equal to or greater than a second predetermined threshold to the total number of objects on the specific pre-training image, and the efficiency(R') is a difference between 1 and a ratio of a sum of areas of the specific sample meta ROIs to the area of the specific pre-training image.

In accordance with another aspect of the present disclosure, there is provided an auto-labeling device for auto-labeling one or more training images to be used for learning a neural network, including: at least one memory that stores instructions; and at least one processor configured to execute the instructions to perform processes of: (I) if a specific training image among the training images is acquired, instructing a meta ROI detection network to generate at least one feature map by applying one or more convolution operations to the specific training image and to acquire n current meta ROIs corresponding to regions of objects, on the specific training image, grouped according to each of locations of each of the objects by referring to the feature map, and (II) generating n manipulated images by cropping regions, corresponding to the n current meta ROIs, on the specific training image, instructing an object detection network to output each of n labeled manipulated images having each of bounding boxes for each of the n manipulated images, and generating a labeled specific training image by merging the n labeled manipulated images.

As one example, at the process of (I), the processor instructs the meta ROI detection network to calculate each of locations, each of sizes, and each of current meta ROI scores of each of the current meta ROIs in each of grid cells on the feature map, and then instructs the meta ROI detection network to determine specific current meta ROIs as the n current meta ROIs wherein the specific current meta ROIs correspond to specific current meta ROI scores, among the current meta ROI scores, equal to or greater than a first predetermined threshold.

As one example, the training images include validation images for verification, and the first predetermined threshold is a specific validation meta ROI score of a specific validation meta ROI, among validation meta ROIs acquired corresponding to the validation images, which has a highest probability of being correct.

As one example, the feature map includes two or more first feature map channels for calculating the locations of the current meta ROIs, two or more second feature map channels for calculating the sizes of the current meta ROIs, and at least one third feature map channel for calculating the current meta ROI scores.

As one example, each of the current meta ROI scores is each result of applying each sigmoid operation to each of probabilities of each of the current meta ROIs being correct.

As one example, at the process of (I), the processor performs one of (i) a process of generating at least one downsized image by downsizing the specific training image and a process of instructing the meta ROI detection network to generate the feature map by applying the convolution operations to the downsized image and (ii) a process of instructing the meta ROI detection network to generate the downsized image by downsizing the specific training image and a process of instructing the meta ROI detection network to generate the feature map by applying the convolution operations to the downsized image.

As one example, the meta ROI detection network includes one or more convolutional layers.

As one example, at the process of (II), the processor, in merging the n labeled manipulated images, removes one or more specific bounding boxes, among the bounding boxes, which appear only partially within a certain distance inward from boundaries of an overlapping area of two or more of the labeled manipulated images.

As one example, at the process of (II), the processor, in merging the n labeled manipulated images, acquires one or more specific bounding boxes corresponding to one or more specific objects within an overlapping area of two or more of the labeled manipulated images by applying a Non Maximum Suppression to the bounding boxes within the overlapping area.

As one example, at the process of (II), the processor resizes the n manipulated images to have a same size and instructs the object detection network to generate the bounding boxes.

As one example, the processor resizes the n manipulated images of the same size including the bounding boxes to have a size corresponding to the specific training image and then merges the n manipulated images.

As one example, a learning device has instructed the meta ROI detection network to complete processes of (i) if at least one specific pre-training image among pre-training images is acquired, generating at least one feature map for pre-training by applying the convolution operations to the specific pre-training image, (ii) calculating meta ROIs for pre-training in each grid cell of the feature map for pre-training, (iii) generating one or more sample meta ROI groups, adjusted by at least one certain rule, corresponding to a meta ROI group for pre-training including the meta ROIs for pre-training, (iv) calculating each of sample meta group scores of each of the sample meta ROI groups, calculating a current meta group score of the meta ROI group for pre-training, and calculating at least one gradient for pre-training to adjust the current meta group score of the meta ROI group for pre-training in a direction derived from specific sample meta ROI groups having the sample meta group scores becoming high, and (v) learning at least part of one or more parameters of the meta ROI detection network by a reinforcement learning using the gradient for pre-training.

As one example, the current meta group score is acquired by accuracy(R)+C×efficiency(R), wherein the accuracy(R) is a ratio of the number of objects detected in all of the meta ROIs for pre-training to a total number of objects on the specific pre-training image, wherein the efficiency(R) is a difference between 1 and a ratio of a sum of areas of the meta ROIs for pre-training to an area of the specific pre-training image, and wherein the C is a maximum among 1 and validation meta group scores acquired corresponding to validation images for pre-training to be used for verification of the pre-training images.

As one example, a sample meta group score of an arbitrary one of the sample meta ROI groups is acquired by accuracy(R')+C×efficiency(R'), wherein the accuracy(R') is a ratio of the number of objects detected in all of sample meta ROIs in said arbitrary one of the sample meta ROI groups to a total number of objects on the specific pre-training image, wherein the efficiency(R') is a difference between 1 and a ratio of a sum of areas of the sample meta ROIs to an area of the specific pre-training image, and wherein the C is a maximum among 1 and validation meta group scores acquired corresponding to validation images for pre-training to be used for verification of the pre-training images.

As one example, the accuracy(R') is a ratio of the number of objects detected in specific sample meta ROIs, among the sample meta ROIs in said arbitrary one of the sample meta ROI groups, having sample meta ROI scores equal to or greater than a second predetermined threshold to the total number of objects on the specific pre-training image, and the efficiency(R') is a difference between 1 and a ratio of a sum of areas of the specific sample meta ROIs to the area of the specific pre-training image.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
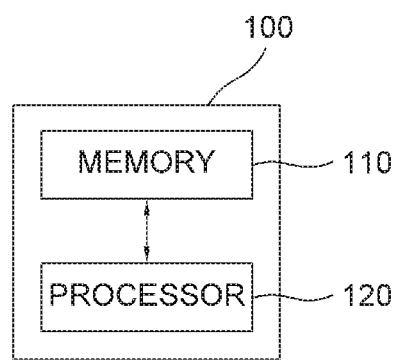
FIG. 1 is a drawing schematically illustrating an auto-labeling device for auto-labeling one or more training images to be used for training a neural network in accordance with one example of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating an auto-labeling device for auto-labeling one or more training images to be used for training a neural network in accordance with one example of the present disclosure. By referring to FIG. 1, the auto-labeling device 100 may include a memory 110 for storing instructions to auto-label the training images, and a processor 120 for performing processes to auto-label the training images corresponding to the instructions in the memory 110.

Specifically, the auto-labeling device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 2:
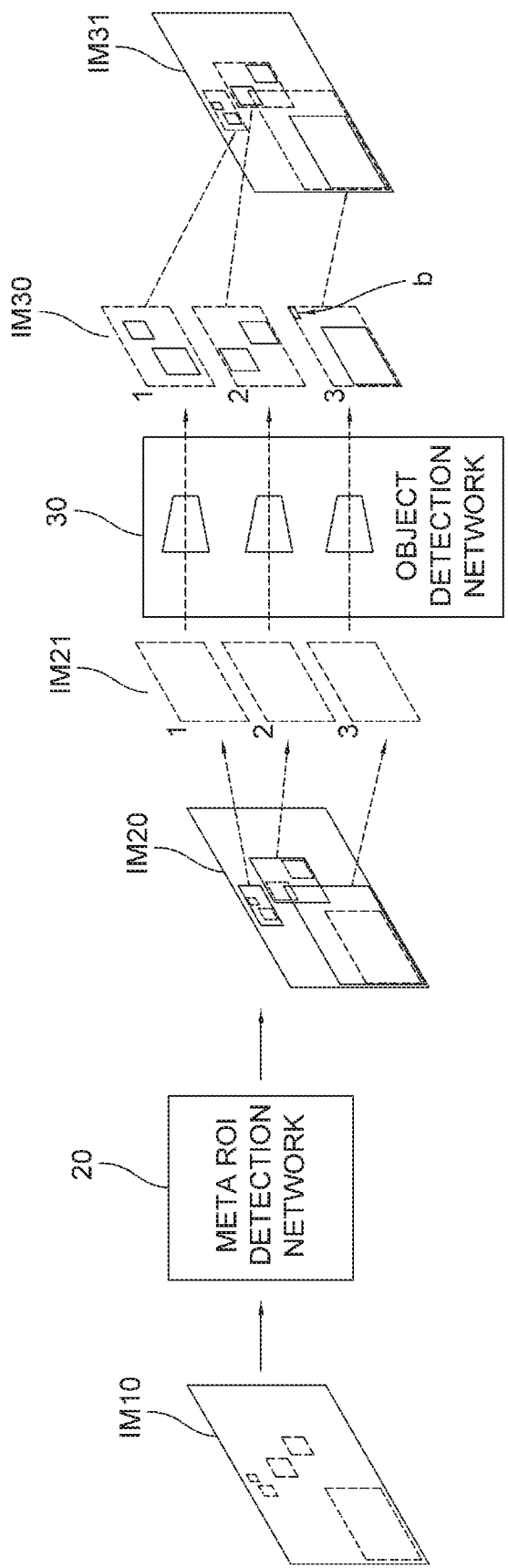
FIG. 2 is a drawing schematically illustrating a method for auto-labeling the training images to be used for training the neural network in accordance with one example of the present disclosure.

A method for labeling the training images to be used for learning the neural network which analyzes images by using the auto-labeling device 100 in accordance with one example of the present disclosure is described by referring to FIG. 2.

First, if at least one specific training image IM10 among the training images is acquired, the auto-labeling device 100 may perform processes of instructing a meta ROI detection network 20 to generate at least one feature map by applying one or more convolution operations to the specific training image IM10 and to acquire n current meta ROIs corresponding to regions of objects, on the specific training image IM10, grouped according to each of locations of each of the objects by referring to the feature map.

Herein, the meta ROI detection network 20 may include one or more convolutional layers, and may generate the feature map with a volume of M×M×L by applying the convolution operations to the specific training image IM10.

Meanwhile, instead of instructing the meta ROI detection network 20 to apply the convolution operations to the specific training image IM10, the auto-labeling device 100 may generate at least one downsized image by downsizing the specific training image IM10 and instruct the meta ROI detection network 20 to apply the convolution operations to the downsized image, in order to reduce computational load.

As one example, the auto-labeling device 100 may perform a process of generating the downsized image by downsizing the specific training image IM10 and a process of instructing the meta ROI detection network 20 to generate the feature map by applying the convolution operations to the downsized image. As another example, the auto-labeling device 100 may perform a process of instructing the meta ROI detection network 20 to generate the downsized image by downsizing the specific training image IM10 and a process of instructing the meta ROI detection network 20 to generate the feature map by applying the convolution operations to the downsized image.

Also, the training images may include validation images with their own true labels. And each of dotted boxes within the specific training image IM10 of the drawing may exemplarily represent each of regions where each of the objects is located on the specific training image IM10.

Figure 3:
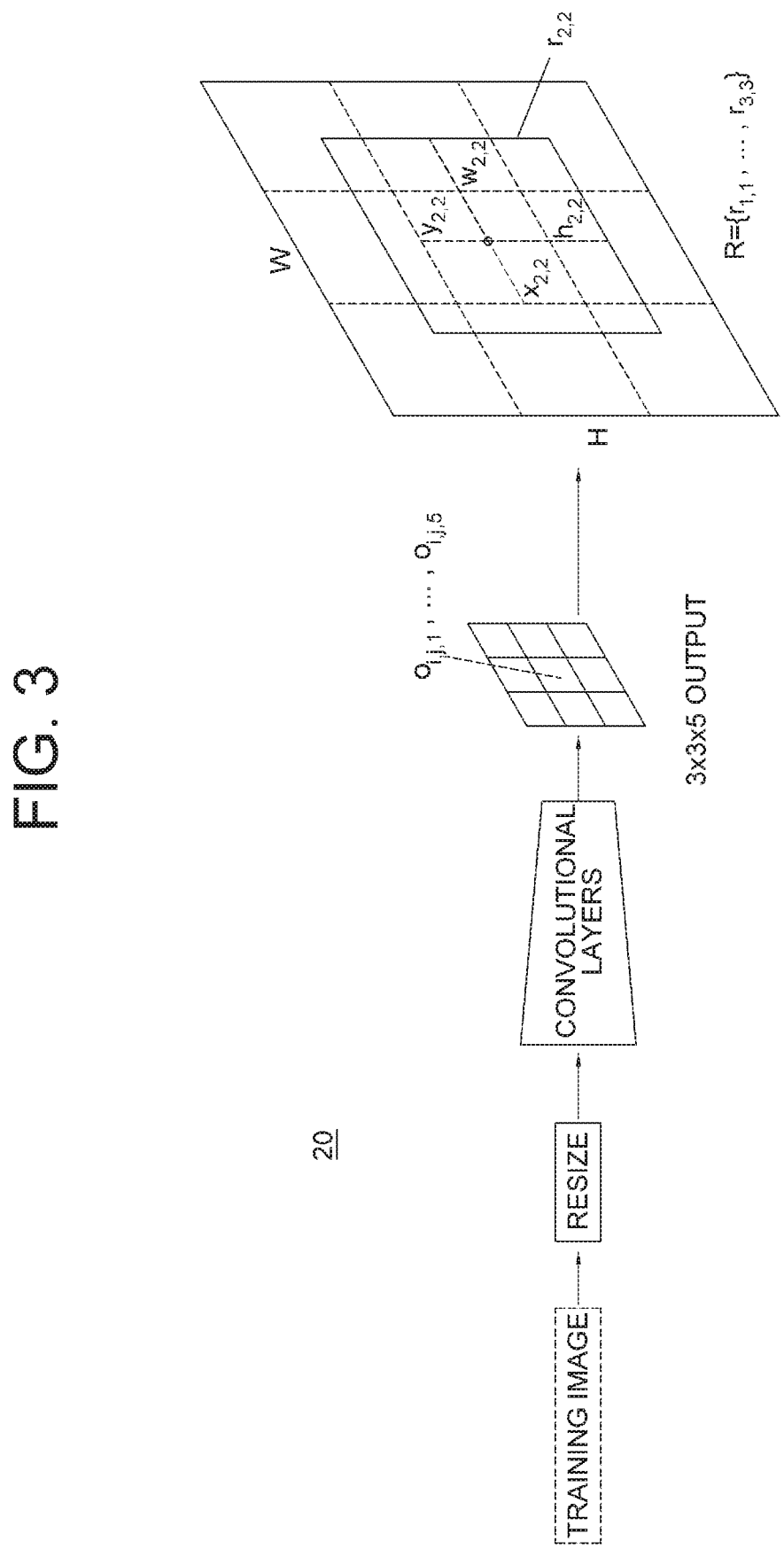
FIG. 3 is a drawing schematically illustrating a process for acquiring current meta ROIs by a meta ROI detection network in a method for labeling the training images to be used for training the neural network in accordance with one example of the present disclosure.

And a method for the meta ROI detection network 20 acquiring the n current meta ROIs by referring to FIG. 3 is described in detail as follows.

If the specific training image IM10 is acquired, the meta ROI detection network 20 may generate the downsized image by downsizing the specific training image IM10 and may input the downsized image into convolutional layers 21. Herein, as aforementioned, the specific training image IM10 may be inputted directly into the convolutional layers 21 without downsizing, but the downsized image may be used for reducing the computational load, that is, the auto-labeling device 100 may input the downsized image into the meta ROI detection network 20.

Then, the convolutional layers 21 may apply the convolution operations to the downsized image, to thereby generate the feature map with a volume of M×M×L.

Thereafter, the meta ROI detection network 20 may calculate each of locations, each of sizes, and each of current meta ROI scores of each of the current meta ROIs in each of grid cells on the feature map with the volume of M×M×L. FIG. 3 shows the feature map with a volume of 3×3×5, but this is for convenience of explanation, and the scope of the present disclosure is not limited thereto. A method for generating the current meta ROIs by using the feature map with the volume of 3×3×5 is described below.

Herein, output values for each of the grid cells on the feature map, that is, feature values, may be represented as $O_{i,j,1}$, $O_{i,j,2}$, $O_{i,j,3}$, $O_{i,j,4}$, and $O_{i,j,5}$, and each of the current meta ROIs for each of the grid cells may be represented as $r_{1,1}, \ldots, r_{2,2}, \ldots,$ and $r_{3,3}$.

And each of the current meta ROIs $r_{i,j}$ for each of the grid cells may be represented as following formulas.

$$x_{i,j} = \frac{W}{6}(1 + \tanh(o_{i,j,1})) \in \left[0, \frac{W}{3}\right]$$

$$y_{i,j} = \frac{H}{6}(1 + \tanh(o_{i,j,2})) \in \left[0, \frac{H}{3}\right]$$

$$w_{i,j} = \frac{H}{4}(1 + \tanh(o_{i,j,3})) \in \left[0, \frac{W}{2}\right]$$

-continued $$h_{i,j} = \frac{H}{4}(1 + \tanh(o_{i,j,4})) \in \left[0, \frac{H}{2}\right]$$

$p_{i,j}$=sigmoid($o_{i,j,s}$)∈[0,1]

Herein, each of $p_{i,j}$ may be each of the current meta ROI scores and may be each result of applying each sigmoid operation to each of probabilities of each of the current meta ROIs being correct.

Also, $x_{i,j}$ and $y_{i,j}$ may represent each of the locations of each of the current meta ROIs, and $w_{i,j}$ and $h_{i,j}$ may represent each of the sizes of each of the current meta ROIs.

Therefore, the feature map may include two or more first feature map channels for calculating the locations of the current meta ROIs, two or more second feature map channels for calculating the sizes of the current meta ROIs, and at least one third feature map channel for calculating the current meta ROI scores.

Also, the feature map with the volume of 3×3×5 may have nine of the current meta ROIs, and the feature map with the volume of M×M×L may have M×M of the current meta ROIs.

Thereafter, the meta ROI detection network 20 may determine specific current meta ROIs as the n current meta ROIs where the specific current meta ROIs correspond to specific current meta ROI scores, among the current meta ROI scores, equal to or greater than a first predetermined threshold, for each of the grid cells on the feature map.

That is, the meta ROI detection network 20 may select the n current meta ROIs, whose current meta ROI scores are equal to or greater than the first predetermined threshold, among the M×M current meta ROIs corresponding to each of the grid cells on the feature map.

Herein, the training images may include the validation images for verification and the first predetermined threshold may be a specific validation meta ROI score of a specific validation meta ROI, among validation meta ROIs acquired corresponding to the validation images, which has a highest probability of being correct.

Meanwhile, the meta ROI detection network 20 may have been learned beforehand, and a learning process for the meta ROI detection network 20 is described as follows.

For reference, in the description below, the phrase "pre-training" or "for pre-training" is added for terms related to a previous learning process that is already completed before a current learning process in which related terms are used without such terms, to avoid possible confusion.

If at least one specific pre-training image among pre-training images is acquired, a learning device (not illustrated) may instruct the meta ROI detection network 20 to apply the convolution operations to the specific pre-training image, to thereby generate at least one feature map for pre-training. Herein, as aforementioned, the convolution operations may be applied to the specific pre-training image without downsizing, but the downsized image may be used for reducing the computational load, that is, the downsized image of the specific pre-training image may be acquired by the learning device. Also, the meta ROI detection network 20 may include one or more convolutional layers.

Also, the learning device may include a memory (not illustrated) for storing instructions to learn the meta ROI detection network 20, and a processor (not illustrated) for performing learning of the meta ROI detection network 20 corresponding to the instructions in the memory. Specifically, the learning device may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software. The processor of the computing device may include hardware configuration of MPU (Micro Processing Unit) or CPU (Central Processing Unit), cache memory, data bus, etc. Additionally, the computing device may further include OS and software configuration of applications that achieve specific purposes. Such description of the computing device does not exclude an integrated device including any combination of a processor, a memory, a medium, or any other computing components for implementing the present disclosure.

And, the learning device may generate meta ROIs R={$r_{1,1}$, ..., $r_{2,2}$, ..., $r_{3,3}$} for pre-training for each of grid cells on the feature map for pre-training, and may generate multiple sample meta ROI groups R'={$r'_{1,1}$, ..., $r'_{2,2}$, ..., $r'_{3,3}$}, adjusted by at least one certain rule, corresponding to a meta ROI group R for pre-training including the meta ROIs for pre-training.

As one example, the sample meta ROI groups R' may be generated to be near the the meta ROI group R for pre-training.

Herein, the adjusted output values for each of the grid cells may be represented as $o'_{i,j,1}, \ldots, o'_{i,j,4}$~$N(o'_{i,j,k}|o'_{i,j,k}, \sigma)$, and the adjusted sample meta ROI scores may be represented as $p'_{i,j}$~Binomial($p_{i,j}$). Herein, its standard deviation a may be 1.

An example of the feature map with the volume of 3×3×5 is described above, but the scope of the present disclosure is not limited thereto, and the same process can be applied to the feature map with the volume of M×M×L.

Thereafter, the learning device may calculate each of sample meta group scores S(R') of each of the sample meta ROI groups R', and may calculate a current meta group score S(R) of the meta ROI group R for pre-training.

Herein, the current meta group score S(R) may be acquired by accuracy(R)+C×efficiency(R), where the accuracy(R) may be a ratio of the number of objects detected in all of the meta ROIs for pre-training to a total number of objects on the specific pre-training image, the efficiency(R) may be a difference between 1 and a ratio of a sum of areas of the meta ROIs for pre-training to an area of the specific pre-training image, and the C may be a maximum among 1 and validation meta group scores acquired corresponding to validation images for pre-training to be used for verification of the pre-training images.

That is, it may be represented as S(R)=Accuracy(R)+C×efficiency(R), $$\text{Accuracy}(R) = \frac{\text{the number of objects detected in all of the meta ROIs for pre-training}}{\text{the total number of objects on the specific pre-training image}},$$

$$\text{Efficiency}(R) = 1 - \frac{\text{the sum of areas of the meta ROIs for pre-training}}{\text{the area of the specific pre-training image}}.$$

Also, the sample meta group score of an arbitrary one of the sample meta ROI groups may be acquired by accuracy (R')+C×efficiency(R'), where the accuracy(R') may be a ratio of a total sum of the number of objects detected in each of sample meta ROIs in said arbitrary one of the sample meta ROI groups to the total number of objects on the specific pre-training image, the efficiency(R') may be a difference between 1 and a ratio of a sum of areas of the sample meta ROIs to the area of the specific pre-training image, and the C may be the maximum among 1 and validation meta group scores acquired corresponding to the validation images for pre-training to be used for verification of the pre-training images. Herein, a specific object appearing in both a first sample meta ROI and a second sample meta ROI in same one of the sample meta ROI groups is not doubly counted.

That is, it may be represented as S(R')=Accuracy(R')+C× efficiency(R'), $$\text{Accuracy}(R') = $$
$$\frac{\text{the number of objects detected in all of sample meta ROIs in said arbitrary one of the sample meta ROI groups}}{\text{the total number of objects on the specific pre-training image}},$$

$$\text{Efficiency}(R') = 1 - \frac{\text{the sum of areas of the sample meta ROIs}}{\text{the area of the specific pre-training image}}.$$

Meanwhile, in calculating the sample meta group score S(R') of an arbitrary one of the sample meta ROI groups R', a specific sample meta ROI whose sample meta ROI score $p'_{i,j}$ is equal to or greater than a second predetermined threshold may be utilized. Herein, the second predetermined threshold may be 1, but the scope of the present disclosure is not limited thereto, and part of the sample meta group scores S(R') of the sample meta ROI groups R' may be set as higher than the current meta group score S(R).

That is, the accuracy(R') may be a ratio of the number of objects detected in the specific sample meta ROIs, among the sample meta ROIs in said arbitrary one of the sample meta ROI groups, having the sample meta ROI scores equal to or greater than the second predetermined threshold to the total number of objects on the specific pre-training image, and the efficiency(R') may be a difference between 1 and a ratio of a sum of areas of the specific sample meta ROIs to the area of the specific pre-training image.

Thereafter, the learning device may calculate at least one gradient for pre-training to adjust the current meta group score S(R) of the meta ROI group R for pre-training in a direction derived from the specific sample meta ROI groups R' having the sample meta group scores S(R') becoming high.

Herein, the learning device may calculate the gradient $\delta_o(R)$ for pre-training using following formulas.

$$\delta_o(R) = $$
$$\frac{1}{\epsilon + \sum_{R':S(R')>S(R)}(S(R')-S(R))} \sum_{R':S(R')>S(R)} (S(R')-S(R))\nabla_o \log p(R'\mid R)$$

$$p(R' \mid R) = \prod_{r'_{i,j} \in R'} N(o'_{i,j,1} \mid o_{i,j,1}, \sigma) \ldots N(o'_{i,j,4} \mid o_{i,j,4}, \sigma) \text{Binomial}(y'_{i,j} \mid p_{i,j})$$

Thereafter, the learning device may adjust at least part of one or more parameters of the meta ROI detection network 20 by a reinforcement learning using the gradient for pre-training. For example, the learning device may adjust at least part of one or more parameters of the convolutional layers in the meta ROI detection network 20 by the reinforcement learning using the gradient for pre-training.

Figure 4:
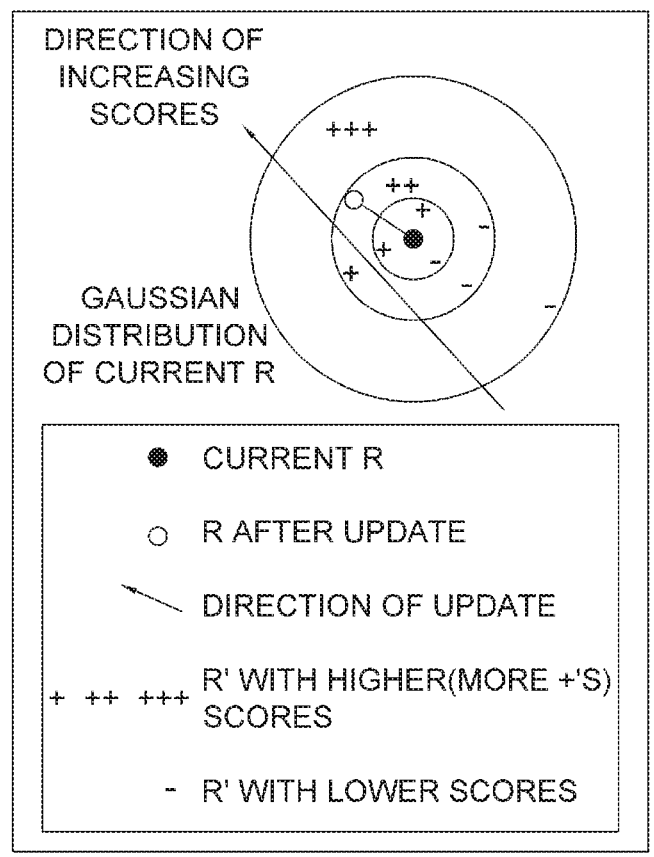
FIG. 4 is a drawing schematically illustrating a process for learning the meta ROI detection network in a method for labeling the training images to be used for training the neural network in accordance with one example of the present disclosure.

That is, by referring to FIG. 4, the sample meta ROI groups R' adjusted on the basis of the meta ROI group R for pre-training may have a Gaussian distribution based on a location of the meta ROI group R for pre-training, and by the reinforcement learning to adjust the meta ROI group R for pre-training in the direction detrived from the sample meta ROI groups R' with high scores, the score of the meta ROI group R for pre-training may become higher due to the learning, and accordingly, the accuracy for acquiring the current meta ROIs may increase.

By referring to FIG. 2 again, the auto-labeling device 100 may generate n manipulated images IM21 by cropping regions, corresponding to the n current meta ROIs, on the specific training image IM20, and may instruct an object detection network 30 to output each of n labeled manipulated images IM30 having each of bounding boxes for each of the n manipulated images IM21.

Herein, the object detection network 30 may be configured as multiple networks each of which corresponds to each of the n manipulated images IM21, and each of the multiple networks may generate the n labeled manipulated images IM30 by generating bounding boxes for each of the n manipulated images IM21, or may resize the n manipulated images IM21 to have a same size and instruct the object detection network 30 to generate the n labeled manipulated images IM30 of the same size.

Figure 5:
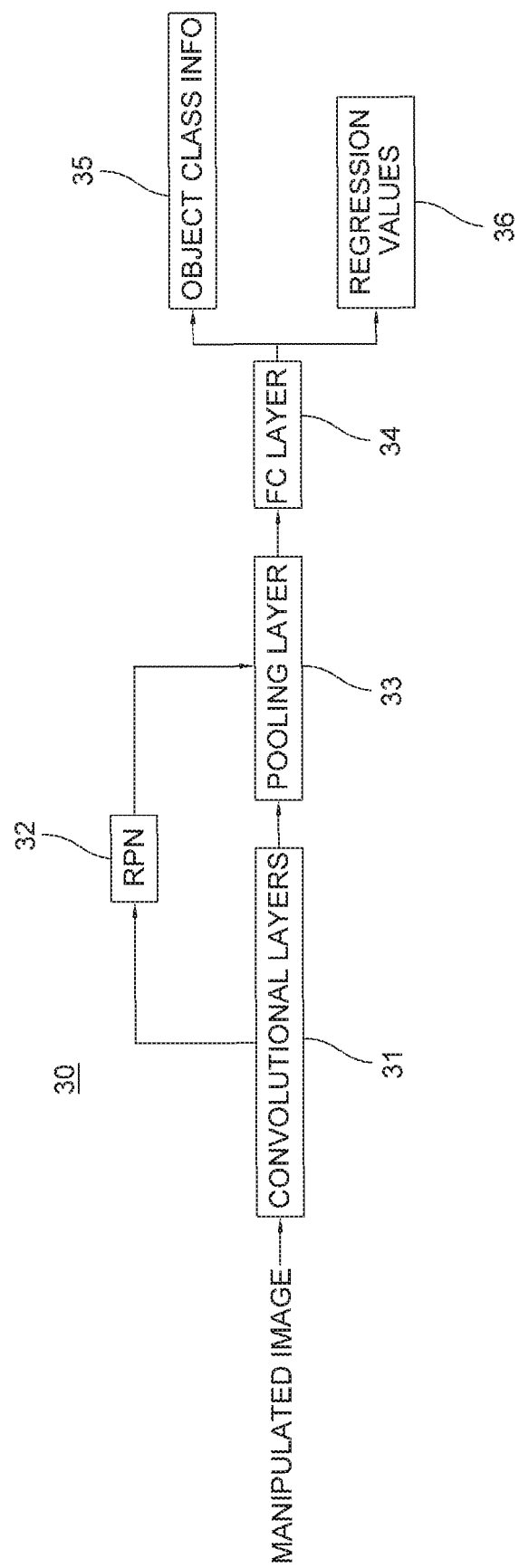
FIG. 5 is a drawing schematically illustrating a process for performing object detection for auto-labeling in a method for labeling the training images to be used for training the neural network in accordance with one example of the present disclosure.

A method for the object detection network 30 to generate the bounding boxes on at least one specific manipulated image is described by referring to FIG. 5.

If the specific manipulated image is acquired, the object detection network 30 may instruct one or more convolutional layers 31 to generate at least one feature map for object detection by applying the convolution operations to the specific manipulated image. Herein, the convolutional layers 31 may generate the feature map for object detection by sequentially applying the convolution operations to the specific manipulated image.

Then the object detection network 30 may instruct the RPN (Region Proposal Network) 32 to generate proposal boxes corresponding to candidate regions, estimated as including the objects, on the feature map for object detection.

Thereafter, the object detection network 30 may instruct at least one pooling layer 33 to generate one or more feature vectors by applying one or more pooling operations to regions, corresponding to the proposal boxes, on the feature map for object detection.

And the object detection network 30 may instruct at least one FC (fully connected) layer 34 to output each piece of object class information 35 and each of regression values 36 corresponding to each of the proposal boxes by using the feature vectors, to thereby generate the bounding boxes corresponding to the objects on the specific manipulated image.

Meanwhile, the object detection network 30 may have been learned beforehand. That is, at least part of one or more parameters of the FC layer 34 and the convolutional layers 31 may have been adjusted by backpropagating one or more losses. Also, the RPN 32 may have been learned beforehand.

By referring to FIG. 2 again, the auto-labeling device 100 may merge the n labeled manipulated images IM30, to thereby generate a labeled specific training image IM31.

Herein, in merging the n labeled manipulated images IM30, the auto-labeling device 100 may remove one or more specific bounding boxes, among the bounding boxes, which appear only partially within a certain distance inward from boundaries of an overlapping area of two or more of the labeled manipulated images IM30. As one example, the auto-labeling device 100 may remove a bounding box b which appears only partially within No. 3 of the labeled manipulated images IM30 and merge the labeled manipulated images IM30.

Also, in merging the n labeled manipulated images IM30, the auto-labeling device 100 may acquire one or more specific bounding boxes corresponding to one or more specific objects within the overlapping area of two or more of the labeled manipulated images IM30 by applying a Non Maximum Suppression to the bounding boxes within the overlapping area. That is, if the overlapping area includes any bounding boxes overlapping each other, a specific bounding box with the highest probability may be set as the specific bounding box corresponding to a specific object, and bounding boxes with lower probabilities may be removed.

Also, in merging the n labeled manipulated images IM30 with the bounding boxes generated thereon, the auto-labeling device 100 may merge the n labeled manipulated images to be corresponding to the specific training image. Specifically, if the n labeled manipulated images IM30 of the same size are to be merged, the n labeled manipulated images IM30 may be respectively resized as corresponding to the specific training image and then merged.

The present disclosure has an effect of reducing the computational load for the auto-labeling by cropping only regions including the objects on an image and then performing the auto-labeling.

The present disclosure has another effect of improving the accuracy of the auto-labeling by cropping and resizing small-sized object regions on the image and then performing the auto-labeling, thus detecting and labeling small-sized objects accurately.

The present disclosure has still another effect of reducing the computational load of the auto-labeling and improving the accuracy by performing cropping and resizing only regions including the objects on the image and then performing the auto-labeling.

The method can be performed to analyze images with high precision by using an online learning, a continual learning, a hyperparameter learning, and a reinforcement learning with policy gradient algorithms.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for auto-labeling one or more training images to be used for learning a neural network, comprising steps of:
   (a) an auto-labeling device, if a specific training image among the training images is acquired, instructing a meta ROI detection network to generate at least one feature map by applying one or more convolution operations to the specific training image and then instructing the meta ROI detection network to acquire n current meta ROIs corresponding to regions of objects by referring to the at least one feature map, on the specific training image, wherein the objects are grouped on the feature map according to each of locations of each of the objects on the specific training image by referring to the feature map, and wherein the n is an integer same as or larger than 1; and
   (b) the auto-labeling device generating n manipulated images by cropping regions, corresponding to the n current meta ROIs, on the specific training image, instructing an object detection network to output each of n labeled manipulated images having each of bounding boxes for each of the n manipulated images, and generating a labeled specific training image by merging the n labeled manipulated images.

2. The method of claim 1, wherein, at the step of (a), the auto-labeling device instructs the meta ROI detection network to calculate each of locations, each of sizes, and each of current meta ROI scores of each of the current meta ROIs in each of grid cells on the feature map, and then instructs the meta ROI detection network to determine specific current meta ROIs as the n current meta ROIs wherein the specific current meta ROIs correspond to specific current meta ROI scores, among the current meta ROI scores, equal to or greater than a first predetermined threshold.

3. The method of claim 2, wherein the training images include validation images for verification and wherein the first predetermined threshold is a specific validation meta ROI score of a specific validation meta ROI, among validation meta ROIs acquired corresponding to the validation images, which has a highest probability of being correct.

4. The method of claim 2, wherein the feature map includes two or more first feature map channels for calculating the locations of the current meta ROIs, two or more second feature map channels for calculating the sizes of the current meta ROIs, and at least one third feature map channel for calculating the current meta ROI scores.

5. The method of claim 2, wherein each of the current meta ROI scores is each result of applying each sigmoid operation to each of probabilities of each of the current meta ROIs being correct.

6. The method of claim 1, wherein, at the step of (a), the auto-labeling device performs one of (i) a process of generating at least one downsized image by downsizing the specific training image and a process of instructing the meta ROI detection network to generate the feature map by applying the convolution operations to the downsized image and (ii) a process of instructing the meta ROI detection network to generate the downsized image by downsizing the specific training image and a process of instructing the meta ROI detection network to generate the feature map by applying the convolution operations to the downsized image.

7. The method of claim 1, wherein the meta ROI detection network includes one or more convolutional layers.

8. The method of claim 1, wherein, at the step of (b), the auto-labeling device, in merging the n labeled manipulated images, removes one or more specific bounding boxes, among the bounding boxes, which appear only partially within a certain distance inward from boundaries of an overlapping area of two or more of the labeled manipulated images.

9. The method of claim 1, wherein, at the step of (b), the auto-labeling device, in merging the n labeled manipulated images, acquires one or more specific bounding boxes corresponding to one or more specific objects within an overlapping area of two or more of the labeled manipulated images by applying a Non Maximum Suppression to the bounding boxes within the overlapping area.

10. The method of claim 1, wherein, at the step of (b), the auto-labeling device resizes the n manipulated images to have a same size and instructs the object detection network to generate the bounding boxes.

11. The method of claim 10, wherein the auto-labeling device resizes the n manipulated images of the same size including the bounding boxes to have a size corresponding to the specific training image and then merges the n manipulated images.

12. The method of claim 1, wherein a learning device has instructed the meta ROI detection network to complete processes of (i) if at least one specific pre-training image among pre-training images is acquired, generating at least one feature map for pre-training by applying the convolution operations to the specific pre-training image, (ii) calculating meta ROIs for pre-training in each grid cell of the feature map for pre-training, (iii) generating one or more sample meta ROI groups, adjusted by at least one certain rule, corresponding to a meta ROI group for pre-training including the meta ROIs for pre-training, (iv) calculating each of sample meta group scores of each of the sample meta ROI groups, calculating a current meta group score of the meta ROI group for pre-training, and calculating at least one gradient for pre-training to adjust the current meta group score of the meta ROI group for pre-training in a direction derived from specific sample meta ROI groups having the sample meta group scores becoming high, and (v) learning at least part of one or more parameters of the meta ROI detection network by a reinforcement learning using the gradient for pre-training.

13. The method of claim 12, wherein the current meta group score is acquired by accuracy(R)+C×efficiency(R), wherein the accuracy(R) is a ratio of the number of objects detected in all of the meta ROIs for pre-training to a total number of objects on the specific pre-training image, wherein the efficiency(R) is a difference between 1 and a ratio of a sum of areas of the meta ROIs for pre-training to an area of the specific pre-training image, and wherein the C is a maximum among 1 and validation meta group scores acquired corresponding to validation images for pre-training to be used for verification of the pre-training images.

14. The method of claim 12, wherein a sample meta group score of an arbitrary one of the sample meta ROI groups is acquired by accuracy(R')+C×efficiency(R'), wherein the accuracy(R') is a ratio of the number of objects detected in all of sample meta ROIs in said arbitrary one of the sample meta ROI groups to a total number of objects on the specific pre-training image, wherein the efficiency(R') is a difference between 1 and a ratio of a sum of areas of the sample meta ROIs to an area of the specific pre-training image, and wherein the C is a maximum among 1 and validation meta group scores acquired corresponding to validation images for pre-training to be used for verification of the pre-training images.

15. The method of claim 14, wherein the accuracy(R') is a ratio of the number of objects detected in specific sample meta ROIs, among the sample meta ROIs in said arbitrary one of the sample meta ROI groups, having sample meta ROI scores equal to or greater than a second predetermined threshold to the total number of objects on the specific pre-training image, and wherein the efficiency(R') is a difference between 1 and a ratio of a sum of areas of the specific sample meta ROIs to the area of the specific pre-training image.

16. An auto-labeling device for auto-labeling one or more training images to be used for learning a neural network, comprising:

at least one memory that stores instructions; and at least one processor configured to execute the instructions to perform processes of (I) if a specific training image among the training images is acquired, instructing a meta ROI detection network to generate at least one feature map by applying one or more convolution operations to the specific training image and then instructing the meta ROI detection network to acquire n current meta ROIs corresponding to regions of objects by referring to the at least one feature map, on the specific training image, wherein the objects are grouped on the feature map according to each of locations of each of the objects on the specific training image by referring to the feature map, and wherein the n is an integer same as or larger than 1, and (II) generating n manipulated images by cropping regions, corresponding to the n current meta ROIs, on the specific training image, instructing an object detection network to output each of n labeled manipulated images having each of bounding boxes for each of the n manipulated images, and generating a labeled specific training image by merging the n labeled manipulated images.

17. The auto-labeling device of claim 16, wherein, at the process of (I), the processor instructs the meta ROI detection network to calculate each of locations, each of sizes, and each of current meta ROI scores of each of the current meta ROIs in each of grid cells on the feature map, and then instructs the meta ROI detection network to determine specific current meta ROIs as the n current meta ROIs wherein the specific current meta ROIs correspond to specific current meta ROI scores, among the current meta ROI scores, equal to or greater than a first predetermined threshold.

18. The auto-labeling device of claim 17, wherein the training images include validation images for verification and wherein the first predetermined threshold is a specific validation meta ROI score of a specific validation meta ROI, among validation meta ROIs acquired corresponding to the validation images, which has a highest probability of being correct.

19. The auto-labeling device of claim 17, wherein the feature map includes two or more first feature map channels for calculating the locations of the current meta ROIs, two or more second feature map channels for calculating the sizes of the current meta ROIs, and at least one third feature map channel for calculating the current meta ROI scores.

20. The auto-labeling device of claim 17, wherein each of the current meta ROI scores is each result of applying each sigmoid operation to each of probabilities of each of the current meta ROIs being correct.

21. The auto-labeling device of claim 16, wherein, at the process of (I), the processor performs one of (i) a process of generating at least one downsized image by downsizing the specific training image and a process of instructing the meta ROI detection network to generate the feature map by applying the convolution operations to the downsized image and (ii) a process of instructing the meta ROI detection network to generate the downsized image by downsizing the specific training image and a process of instructing the meta ROI detection network to generate the feature map by applying the convolution operations to the downsized image.

22. The auto-labeling device of claim 16, wherein the meta ROI detection network includes one or more convolutional layers.

23. The auto-labeling device of claim 16, wherein, at the process of (II), the processor, in merging the n labeled manipulated images, removes one or more specific bounding boxes, among the bounding boxes, which appear only partially within a certain distance inward from boundaries of an overlapping area of two or more of the labeled manipulated images.

24. The auto-labeling device of claim 16, wherein, at the process of (II), the processor, in merging the n labeled manipulated images, acquires one or more specific bounding boxes corresponding to one or more specific objects within an overlapping area of two or more of the labeled manipulated images by applying a Non Maximum Suppression to the bounding boxes within the overlapping area.

25. The auto-labeling device of claim 16, wherein, at the process of (II), the processor resizes the n manipulated images to have a same size and instructs the object detection network to generate the bounding boxes.

26. The auto-labeling device of claim 25, wherein the processor resizes the n manipulated images of the same size including the bounding boxes to have a size corresponding to the specific training image and then merges the n manipulated images.

27. The auto-labeling device of claim 16, wherein a learning device has instructed the meta ROI detection network to complete processes of (i) if at least one specific pre-training image among pre-training images is acquired, generating at least one feature map for pre-training by applying the convolution operations to the specific pre-training image, (ii) calculating meta ROIs for pre-training in each grid cell of the feature map for pre-training, (iii) generating one or more sample meta ROI groups, adjusted by at least one certain rule, corresponding to a meta ROI group for pre-training including the meta ROIs for pre-training, (iv) calculating each of sample meta group scores of each of the sample meta ROI groups, calculating a current meta group score of the meta ROI group for pre-training, and calculating at least one gradient for pre-training to adjust the current meta group score of the meta ROI group for pre-training in a direction derived from specific sample meta ROI groups having the sample meta group scores becoming high, and (v) learning at least part of one or more parameters of the meta ROI detection network by a reinforcement learning using the gradient for pre-training.

28. The auto-labeling device of claim 27, wherein the current meta group score is acquired by accuracy(R)+C×efficiency(R),
wherein the accuracy(R) is a ratio of the number of objects detected in all of the meta ROIs for pre-training to a total number of objects on the specific pre-training image,
wherein the efficiency(R) is a difference between 1 and a ratio of a sum of areas of the meta ROIs for pre-training to an area of the specific pre-training image, and
wherein the C is a maximum among 1 and validation meta group scores acquired corresponding to validation images for pre-training to be used for verification of the pre-training images.

29. The auto-labeling device of claim 27, wherein a sample meta group score of an arbitrary one of the sample meta ROI groups is acquired by accuracy(R')+C×efficiency(R'),
wherein the accuracy(R') is a ratio of the number of objects detected in all of sample meta ROIs in said arbitrary one of the sample meta ROI groups to a total number of objects on the specific pre-training image,
wherein the efficiency(R') is a difference between 1 and a ratio of a sum of areas of the sample meta ROIs to an area of the specific pre-training image, and
wherein the C is a maximum among 1 and validation meta group scores acquired corresponding to validation images for pre-training to be used for verification of the pre-training images.

30. The auto-labeling device of claim 29, wherein the accuracy(R') is a ratio of the number of objects detected in specific sample meta ROIs, among the sample meta ROIs in said arbitrary one of the sample meta ROI groups, having sample meta ROI scores equal to or greater than a second predetermined threshold to the total number of objects on the specific pre-training image, and
wherein the efficiency(R') is a difference between 1 and a ratio of a sum of areas of the specific sample meta ROIs to the area of the specific pre-training image.

* * * * *